United States Patent [19]

Sanderson et al.

[11] Patent Number: 5,767,436
[45] Date of Patent: Jun. 16, 1998

[54] AIRCRAFT SUPPORT PLANK MOUNTING OF 30 MM MACHINE GUNS

[75] Inventors: Paul H. Sanderson, 2019 Cripple Creek. Lewisville, Tex. 75067; Charles E. Rostocil, Lake Oswego, Oreg.

[73] Assignee: Paul H. Sanderson, Lewisville, Tex.

[21] Appl. No.: 812,756

[22] Filed: Mar. 6, 1997

[51] Int. Cl.$^6$ ............................. F41A 23/00; B64D 7/00
[52] U.S. Cl. ............................. 89/37.22; 89/37.16
[58] Field of Search ........................ 89/37.22, 37.03, 89/37.04, 37.16, 37.17, 37.19

[56] References Cited

U.S. PATENT DOCUMENTS

| 2,380,773 | 7/1945 | McMullen | 89/37.19 |
|---|---|---|---|
| 2,403,591 | 7/1946 | Ewart | 89/37.03 |
| 2,454,502 | 11/1948 | Christian | 89/37.17 |
| 4,966,063 | 10/1990 | Sanderson et al. | 89/37.22 |
| 5,187,318 | 2/1993 | Sanderson et al. | 89/37.22 |
| 5,390,582 | 2/1995 | Sanderson | 89/37.03 |
| 5,417,141 | 5/1995 | Sanderson | 89/37.22 |
| 5,419,234 | 5/1995 | Sanderson | 89/37.22 |

*Primary Examiner*—Charles T. Jordan
*Assistant Examiner*—Theresa M. Wesson
*Attorney, Agent, or Firm*—Konneker & Smith, P.C.

[57] ABSTRACT

An elongated support plank structure longitudinally extends transversely through the cabin area of a helicopter and has outer end portions projecting outwardly beyond opposite sides of the helicopter. A pair of 30 mm machine guns are mounted on the plank end portions and are supplied with belted ammunition from magazine boxes mounted on the plank within the cabin area via flexible feed chutes interconnected between the magazine boxes and interiorly rollered feed adapters interconnected between the outer ends of the feed chutes and the inlets of the machine gun feeder mechanisms. The 30 mm machine guns are secured to the outer plank end portions by specially designed mounting structures each having a cradle portion with axis-adjustable roller assemblies that engage the gun and essentially preclude lateral movement thereof relative to the cradle, but permit roller-guided longitudinal gun recoil movement, during firing of the gun. During firing of the gun, the gun moves longitudinally relative to fixed position recoil pin portions of the mounting structure and resiliently transfers its longitudinal recoil and counter recoil forces to such pin portions. Each cradle is gimbal-supported within a mounting structure securable to one of the plank ends, and a bore sight adjustment subassembly is interconnected between the mounting structure and the cradle and is used to pivotally adjust the cradle relative to the mounting structure about two mutually perpendicular axes to thereby adjust the elevation and azimuth bore sight settings of the gun.

30 Claims, 12 Drawing Sheets

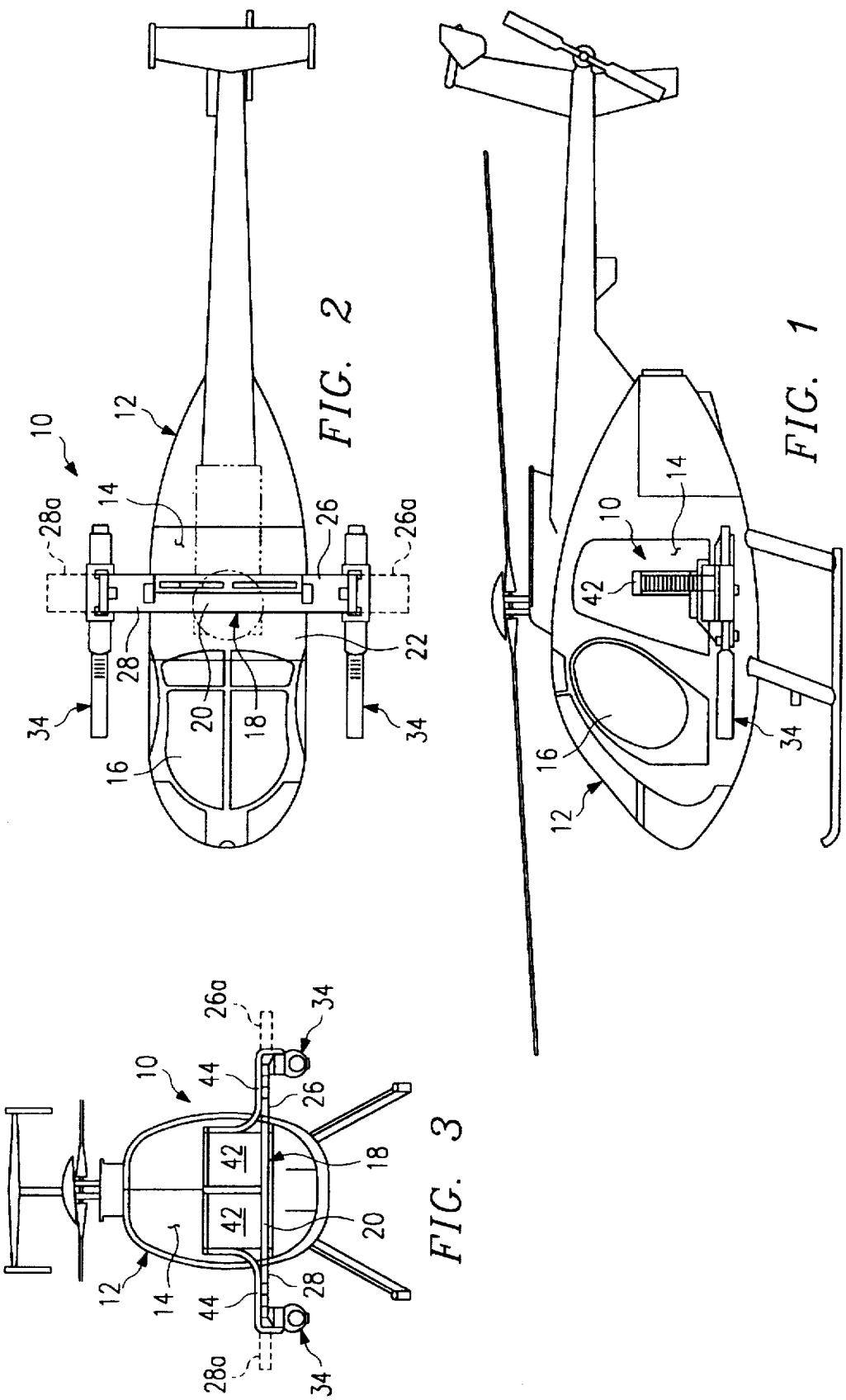

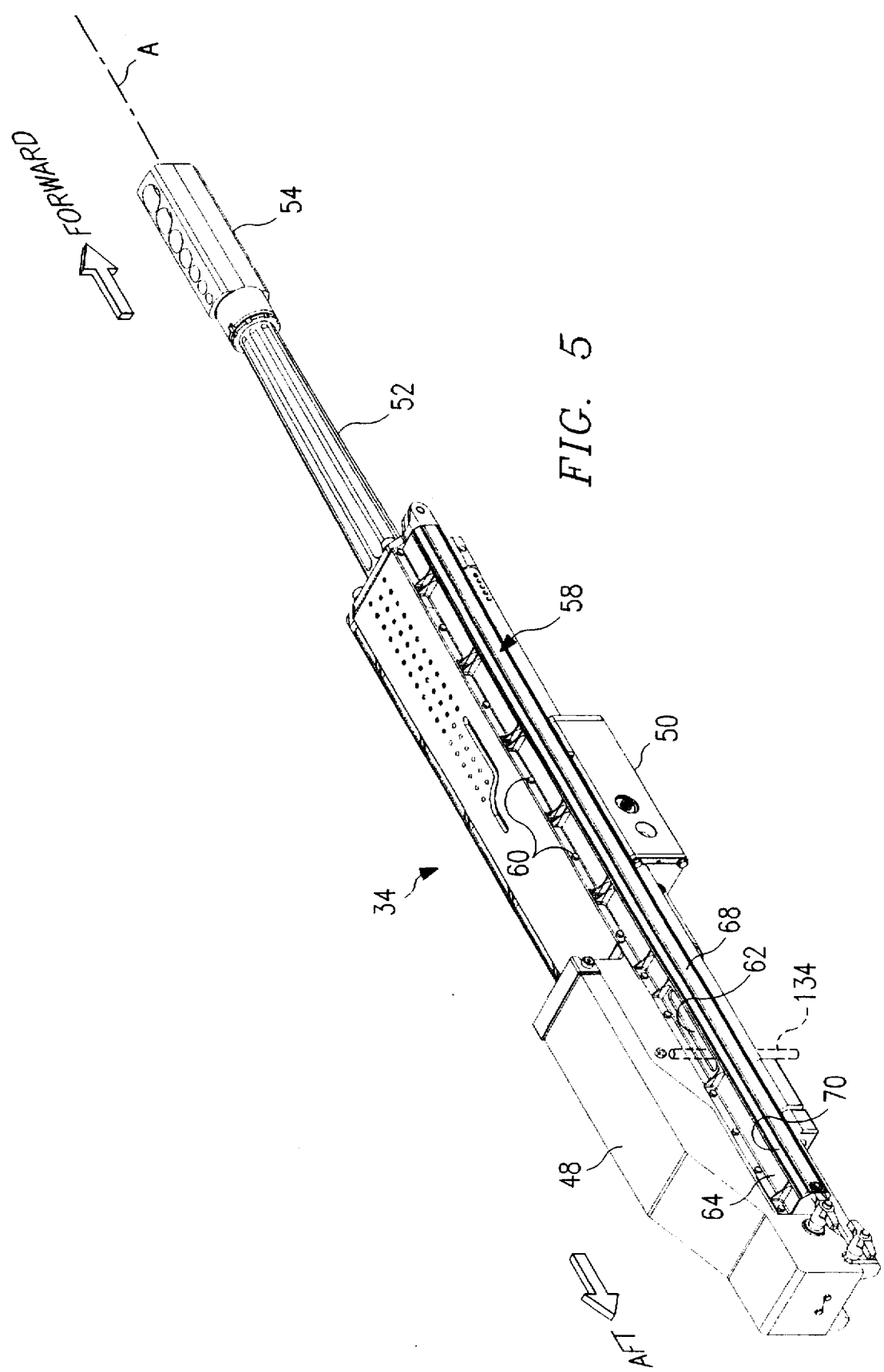

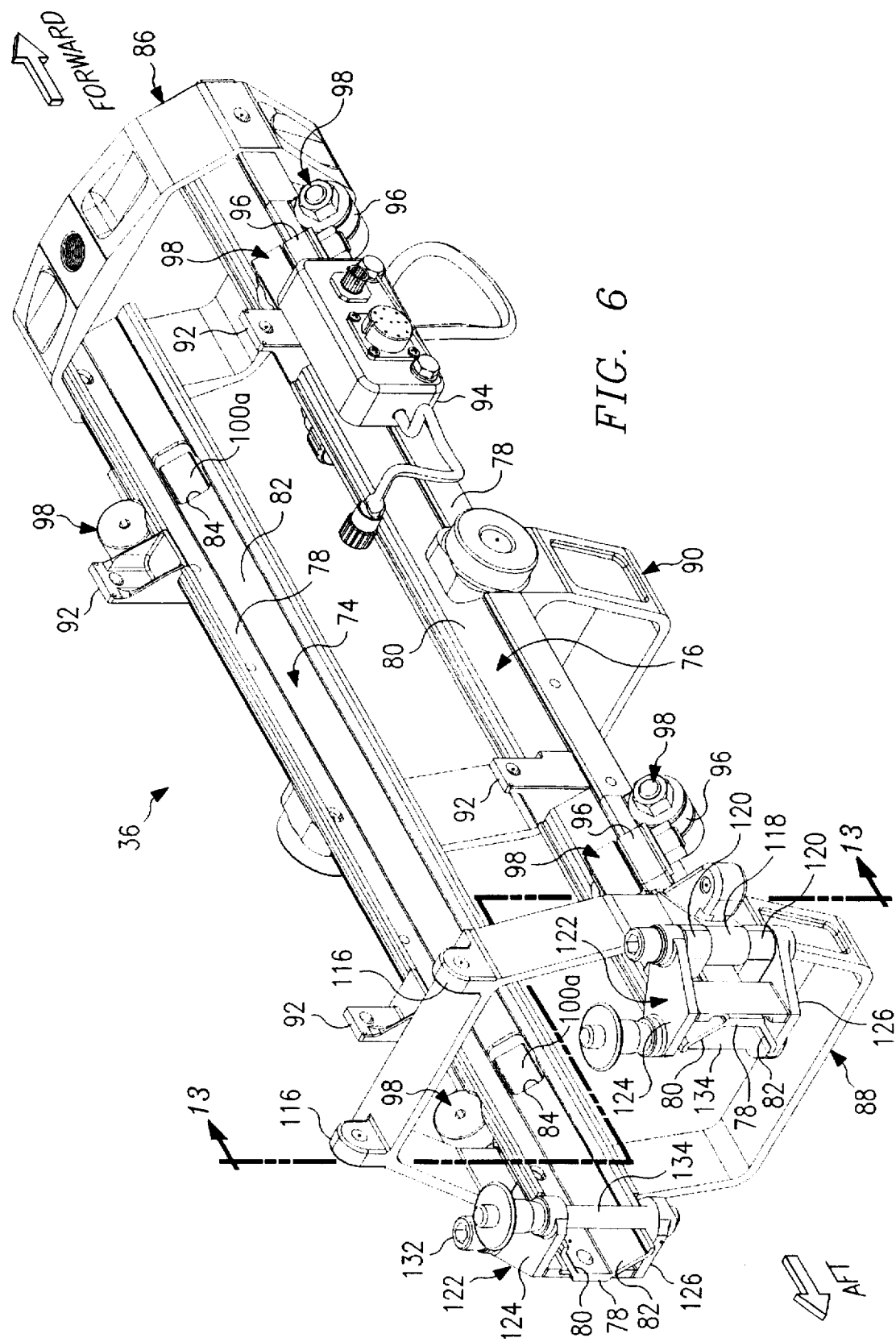

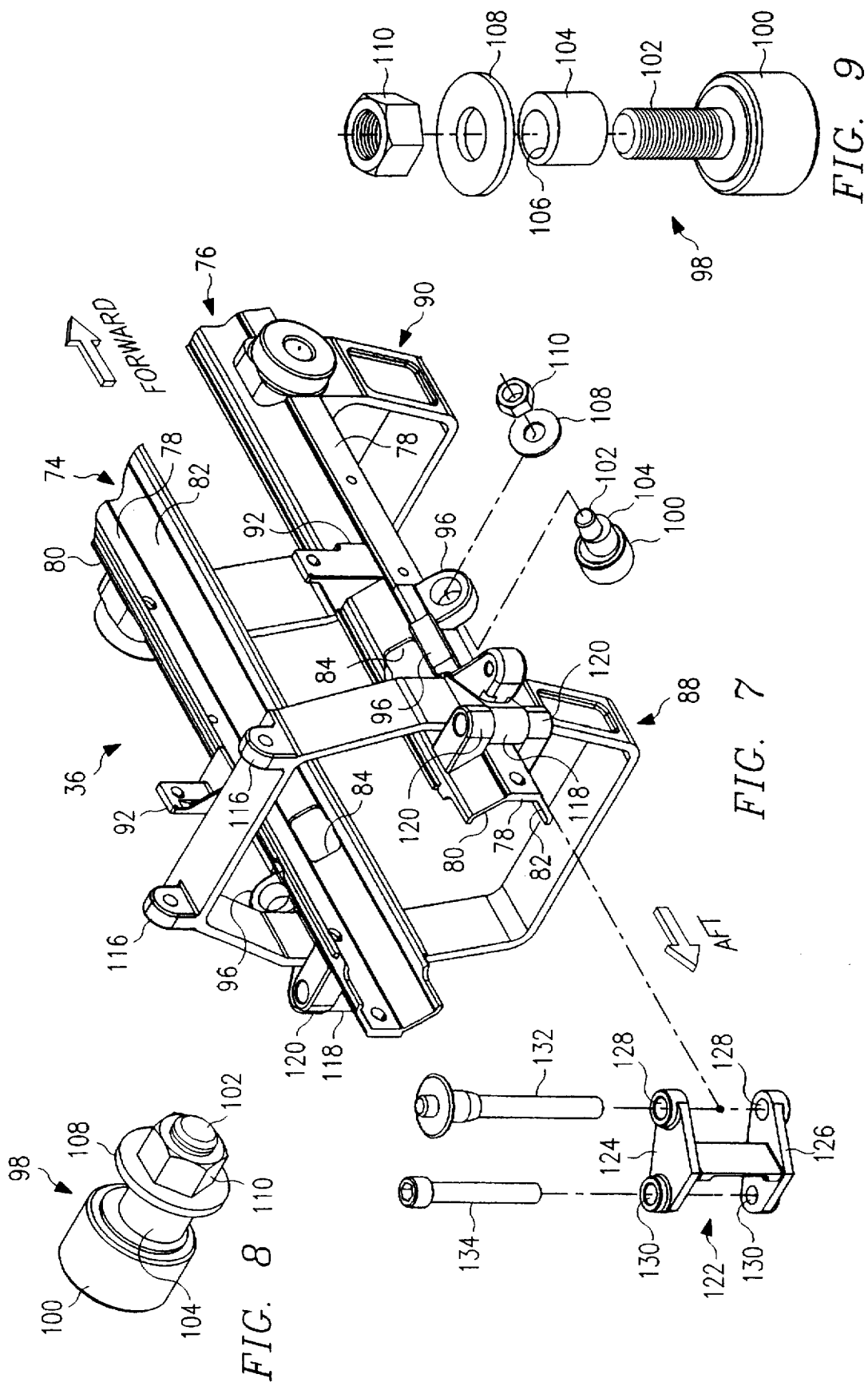

AIRCRAFT SUPPORT PLANK MOUNTING OF 30 MM MACHINE GUNS

CROSS-REFERENCE TO RELATED APPLICATIONS

This application illustrates and describes subject matter similar to that illustrated and described in U.S. Pat. No. 4,966,063 to Sanderson et al and U.S. Pat. No. 5,419,234 to Sanderson. The disclosures of these two U.S. patents are hereby incorporated herein by reference.

BACKGROUND OF THE INVENTION

The present invention generally relates to aircraft armament apparatus and, in a preferred embodiment thereof, more particularly relates to the external support plank mounting of machine guns, representatively 30 mm machine guns, at the cabin area of aircraft such as helicopters.

The external mounting on aircraft of weaponry such as machine guns has heretofore carried with it a variety of structural, operational and safety limitations and disadvantages. To a great extent these problems have been eliminated by using a honeycombed metal support plank such as that illustrated and described in U.S. Pat. No. 5,419,234 to Sanderson. As illustrated in such patent, 40 mm machine guns are mounted on opposite support plank ends which project outwardly from the cabin area of a helicopter.

A particularly difficult external aircraft mounting problem is presented by the much higher recoil 30 mm machine gun. In previously proposed nonplank-based external aircraft mounting systems for 30 mm machine guns, several problems, limitations and disadvantages have been present. For example, due to the high recoil forces generated by firing the 30 mm machine gun, their external aircraft mounts have tended to be quite complex—an undesirable characteristic arising from the need to protect the "light" helicopter (such as an McDonnell Douglas MD 500 or Bell Model 206 helicopter) from structural damage from recoil forces, and to prevent loss of pilot control of the aircraft during gun firing. Attempts to design an external aircraft mount structure for the 30 mm machine structure have heretofore not been entirely successful in either of these areas.

Another limitation present in previously proposed external aircraft 30 mm machine gun mounting systems has been that of maintaining gun bore sighting accuracy during firing of the weapon. Specifically, the conventional gib-and-way attachment of the 30 mm machine gun to its mount, a type of tongue-in-groove arrangement, tends to permit an undesirable amount of side-to-side play of the gun during its firing. The result is that the externally mounted machine gun system becomes an "area" weapon system in which the fired rounds spray around the target in a shotgun fashion instead of being a "point" weapon system in which the fired rounds proceed in a much narrower, more rifle-like pattern toward the target.

Given the various benefits of the support plank-type armament mounting system it would, in view of the foregoing, be highly desirable to provide a 30 mm machine gun mounting structure which is operatively attachable to a support plank of the type generally described above, and which is of a relatively simple construction and provides improved firing accuracy compared to previously proposed 30 mm machine gun external aircraft mounting systems. It is accordingly an object of the present invention to provide such improved, support plank-based 30 mm machine gun mounting apparatus.

SUMMARY OF THE INVENTION

In carrying out principles of the present invention, in accordance with a preferred embodiment thereof, improved aircraft armament apparatus is provided that includes an elongated support plank that may be transversely secured to, for example, the cabin area floor of a helicopter and has an outer end portion that is configured to extend outwardly beyond an external side portion of the aircraft. The armament apparatus also includes two machine guns, representatively 30 mm machine guns, and specially designed mounting apparatus for securing the machine guns to opposite outer end portions of the support plank. Each of the machine guns has a barrel extending along a firing axis, and a receiver portion having an opposite pair of side sections extending generally parallel to the firing axis. Representatively, these side sections are defined by elongated recoil housings.

At each end of the support plank the mounting apparatus, in a preferred embodiment thereof, comprises a mount structure, means for securing the mount structure to the outer end portion of the support plank, and a cradle structure receiving the machine gun and having a plurality of elongated parallel support members extending in an outwardly opposing, parallel relationship with the receiver portion side sections. Roller means are associated with the support members and engage the receiver portion side sections in a manner (1) rollingly supporting the machine gun for axial movement relative to the cradle structure, and (2) precluding appreciable lateral movement of the machine gun relative to the cradle structure during such axial movement. The roller means are adjustable in a manner selectively varying the lateral orientation of the machine gun relative to the cradle structure.

Representatively, the roller means include a plurality of cam roller assemblies which include roller members having side portions extending through openings in the support members, the assemblies permitting the roller members to be selectively moved through the support member openings toward and away from the receiver portion side sections. Preferably, the support members have inwardly sloped opposite side edge portions (preferably sloped at approximately 45 degrees) in which the roller member openings are formed, and the recoil housings have similarly sloped wall portions which the roller members engage.

Interconnection means are carried by the cradle structure and are operative to engage the machine gun in a manner permitting only a predetermined length of axial travel thereof relative to the cradle structure. Representatively, the interconnection means include pin members extending through axially elongated slots formed in the recoil housings.

Pivot means interconnect the cradle structure and the mount structure and permit pivotal adjustment movement of the cradle structure relative to the mount structure about first and second mutually perpendicular bore sight adjustment axes each perpendicular to the firing axis of the machine gun. Representatively, the pivot means include an outer gimbal ring pivotally connected to the mount structure, and an inner gimbal ring secured to the cradle structure and pivotally connected to the outer gimbal ring.

Bore sight adjustment means are interconnected between the mount structure and the cradle structure and are operative to releasably hold the cradle structure in a selectively variable pivotally adjusted position relative to the mount structure. Representatively, the bore sight adjustment means include a first member secured to the mount structure, and a second member secured to the cradle structure. The first and second members are in a nested arrangement permitting relative sliding adjustment movement therebetween in first and second perpendicular directions respectively parallel to the first and second bore sight adjustment axes. A locking structure is associated with the first and second members and is operative to releasably lock them in selectively variable relatively adjusted positions thereto to correspondingly lock the cradle structure (and thus the machine gun) in selectively variable pivotally adjustment positions relative to the mount structure.

In a preferred embodiment thereof, the armament apparatus also includes, for each mounted machine gun, an ammunition feed structure fixedly secured to the cradle structure, an ammunition magazine box mounted on the support plank, an internally rollered ammunition feed adapter connected to the feed structure, and a flexible ammunition feed chute structure connected at one end to the magazine box, and at the other end to the feed adapter.

The mounting apparatus, which serves to support its associated 30 mm machine gun on an outer plank end portion, provides several advantages over conventionally constructed external aircraft machine gun mounting apparatus. For example, the axis-adjustable roller support of the cradle-mounted machine gun firmly precludes appreciable lateral movement of the gun relative to its cradle structure, and thus with respect to the overall mounting apparatus, while permitting free axial travel of the gun relative to the mounting apparatus. This precise lateral support of the 30 mm machine gun permits the overall weapon system to be a "point" weapon system instead of a decidedly less accurate "area" weapon system.

Moreover, the pin and slot connection of the cradle structure to the machine gun permits the gun, during firing thereof, to move through a substantially longer recoil and counter recoil stroke than conventional 30 mm machine guns, thereby reducing the maximum firing forces transmitted to the mounting structure and to the support plank. Aiding this recoil force reduction is the mounting of the ammunition feed structure to the stationary mounting apparatus instead of on the gun for recoil and counter recoil longitudinal reciprocation therewith.

Complementing the firing accuracy improvement obtained by the roller-support of the cradle mounted machine gun is the simplicity and accuracy of the bore sight adjustment structure that, with the cradle-to-mount gimbaling system, provides for rapid, easy and reliable firing elevation and azimuth angle adjustment of the gun.

While the mounting apparatus of the present invention is illustratively described herein as being utilized with a 30 mm machine gun, it will be readily appreciated by those skilled in the aircraft armament art that the gun mounting principles of the present invention could be advantageously applied to other types of machine guns as well if desired.

BRIEF DESCRIPTION OF THE DRAWINGS

FIGS. 1, 2 and 3, respectively, are phantomed side elevational, top plan and front end views of a representative light helicopter to which is transversely secured a cabin area support plank structure with 30 mm machine guns carried on opposite ends thereof by specially designed mounting apparatus embodying principles of the present invention;

FIG. 5 is an enlarged scale perspective view of a machine gun portion of the armament apparatus;

FIG. 6 is an enlarged scale aft end perspective view of a support cradle portion of the armament apparatus;

FIG. 7 is a partially exploded perspective view of an aft end portion of the support cradle;

FIG. 8 is an enlarged scale perspective view of an eccentric cam roller assembly used in the support cradle;

FIG. 9 is an exploded perspective view of the cam roller assembly;

DETAILED DESCRIPTION

Figure 4:
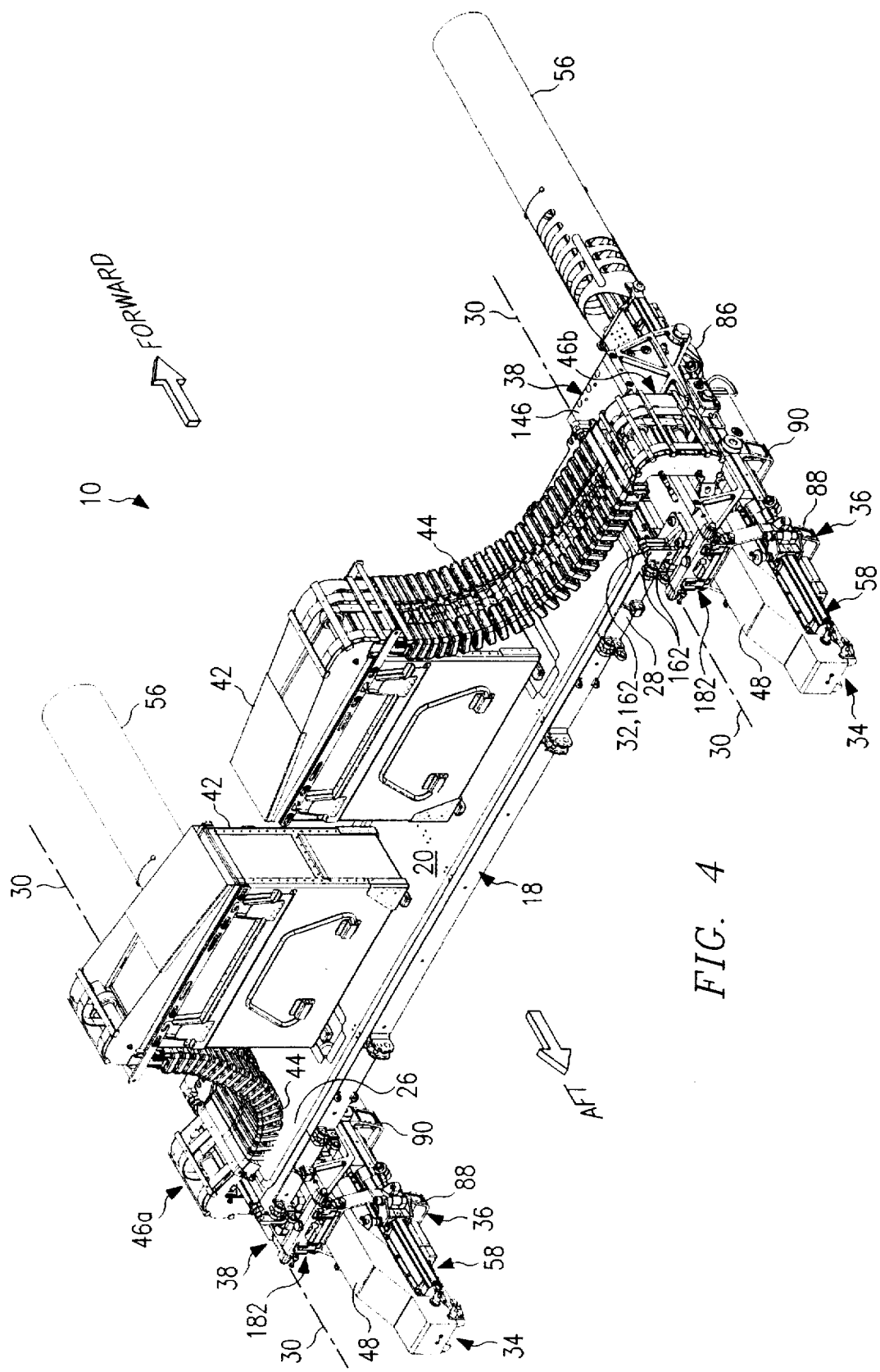
FIG. 4 is an enlarged scale perspective view of the plank-supported aircraft armament apparatus shown in FIGS. 1-3.

Referring initially to FIGS. 1-4A, the present invention provides improved armament apparatus 10 which is operatively connected to a representative helicopter 12 (see FIGS. 1-3) having a cabin area 14 positioned rearwardly of a cockpit area 16. The armament apparatus 10 includes an elongated metal support plank structure 18 which is generally similar to that illustrated and described in U.S. Pat. No. 5,419,234 to Sanderson which has been incorporated herein by reference.

The support plank structure 18 is longitudinally extended transversely through cabin area 14 and has a central longitudinal portion 20 which is suitably anchored to the floor 22 of the cabin area 14, thus operatively securing armament apparatus 10 to the helicopter 12. Left and right outer end portions 26 and 28 of the support plank 18 (as viewed from the rear of the helicopter 12) project outwardly from opposite sides of the helicopter body. Outer plank end portions 26 and 28 have removable outer tip sections 26a,28a (shown in phantom in FIGS. 2 and 3) which are pivotable, about hinge lines 30 (see FIG. 4), relative to their associated plank portions 26 and 28.

When the armament apparatus 10 is utilized, the plank tip sections 26a,28a are removed, being shown in phantom in FIGS. 2 and 3 for reference purposes only. Mounting tab pairs 32 (see FIG. 4A) are formed on the outer ends of the plank portions 26 and 28 and, using suitable bolts, ball pins or expansion pins (not shown), are securable to corresponding tab pairs (also not shown) on the tip sections 26a,28a to attach these tip sections as illustrated and described in U.S. Pat. No. 4,966,063 to Sanderson et al.

Figure 4A:
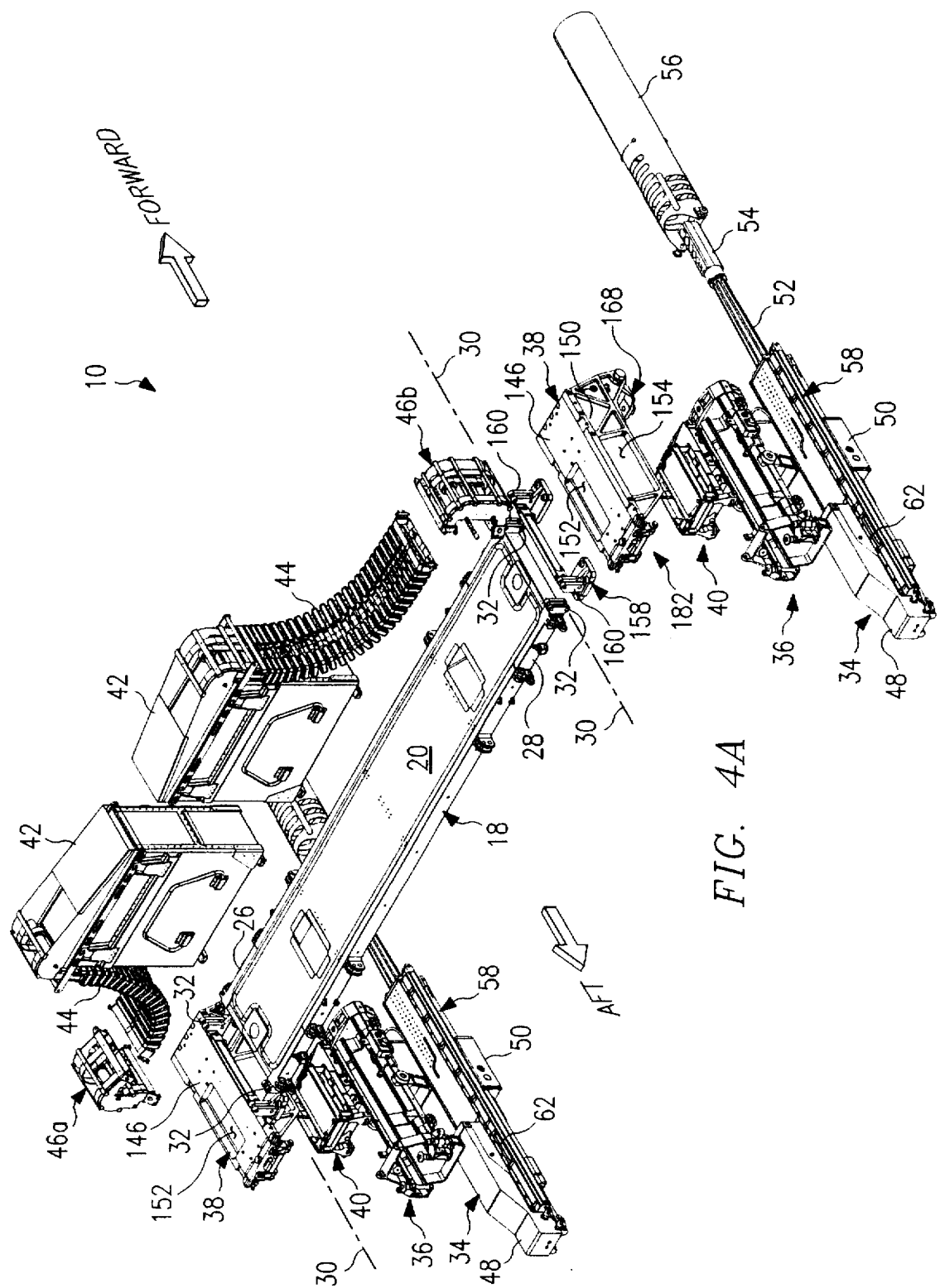
FIG. 4A is a slightly reduced scale exploded perspective view of the FIG. 4 armament apparatus.

Turning now to FIGS. 4 and 4A, in addition to the support plank 18 the armament apparatus 10 also includes below each opposite plank end portion 26 and 28 (1) a machine gun, representatively a 30 mm machine gun 34; (2) a mounting structure operative to secure the gun 34 to its associated plank end portion 26 or 28 and including specially designed cradle and mount structures 36 and 38; and (3) an ammunition feed structure 40.

Armament apparatus 10 further includes (4) a pair of 30 mm magazine boxes 42 secured to the top side of the central plank portion 20 and containing belted 30 mm ammunition (not shown); (5) a pair of elongated flex chute structures 44 through which the belted ammunition passes outwardly from its associated magazine box; and (6) a pair of internally rollered left and right feed adapters 46a,46b respectively interconnected between the left flex chute structure 44 and the left magazine box 42 (as viewed from the rear of the helicopter), and interconnected between the right flex chute structure 44 and the right magazine box 42.

Magazine boxes 42 are similar to those illustrated and described in U.S. Pat. No. 5,419,234 except that they are sized to accept 30 mm belted ammunition. Similarly, internally rollered feed adapters 46a,46b are similar to those illustrated in U.S. Pat. No. 5,419,234 but are sized and shaped to handle 30 mm belted ammunition. Flex chutes 44 are of a conventional construction.

Each 30 mm machine gun 34, as shown in FIG. 5, has a horizontally elongated, generally rectangularly cross-sectioned receiver or body portion 48, a charging unit 50 mounted on the underside of the receiver 48, a forwardly projecting barrel 52 with a muzzle brake 54 on its forward end and a firing axis A, and a blast suppressor tube 56 (see FIG. 4) coaxially circumscribing and projecting forwardly beyond the muzzle brake. Elongated recoil housings 58 are secured by screws 60 to opposite sides of the receiver 48 and extend longitudinally in front-to-rear directions along their lengths. For purposes later described herein, elongated slots 62 extend through the top and bottom side walls 64,66 of the recoil housings 58 (see FIG. 13) adjacent their rear ends.

Additionally, along their lengths, the recoil housings 58 have outer side walls 68 joined to their top and bottom walls 64,66 by sloping outer top and bottom corner wall portions 70,72. Top corner wall portions 70 slope downwardly and outwardly at a 45 degree angle, and bottom corner wall portions 72 slope upwardly and outwardly at a 45 degree angle. Resilient recoil structures (not shown) are operatively disposed within the interiors of the recoil housings 58.

Turning now to FIGS. 6-9 and 13, each cradle 36 includes a laterally spaced pair of parallel left and right elongated support rail members 74 and 76 that longitudinally extend in front-to-rear directions. Each support rail member 74 and 76 has a generally vertically oriented outer side wall 78, a top edge wall 80 that slopes upwardly and inwardly toward the other support rail member at a 45 degree angle, and a bottom edge wall 82 that slopes downwardly and inwardly toward the other support rail member at a 45 degree angle. For purposes later described herein, rectangular cutout areas 84 are formed in each of the support rail edge walls 80 and 82 adjacent their front and rear ends.

At their front ends the support rail members 74,76 extend through and are welded to opposite inner side surface portions of a forward ring structure 86. As later described herein, the forward ring structure 86 is used as a bore sighting gimbal ring. Rear end portions of the support rail members 74,76 extend through and are welded to opposite inner side surface portions of an aft ring structure 88, with rear end portions of the support rail members 74,76 extending rearwardly past the ring structure 88 as shown in FIGS. 6 and 7. An intermediate half ring structure 90 is positioned between the ring structures 86,88 and has opposite upper end portions thereof welded to outer side surface portions of the support rail members 74,76.

Each of the support rail members 74 and 76 has, along its length, a spaced pair of upwardly projecting feeder attachment pads 92 secured thereto, and an electrical connection box 94 is suitably secured to an outer side portion of the right support rail member 76 adjacent its front end. As illustrated in FIGS. 6 and 7, apertured mounting bosses 96 project outwardly from outer side surface portions of the sloping top and bottom edge walls 80,82 of the support rail members 74 and 76 at the rectangular cutout areas 84 thereon. Bosses 96 are used to mount adjustable eccentric cam roller assemblies 98 at the cutout areas 84.

As best illustrated in FIGS. 8 and 9, each of the eight cam roller assemblies 98 used in each cradle structure 36 includes a roller member 100 having a threaded attachment stud 102 centrally secured thereto, a cylindrical bushing 104 with an eccentrically positioned circular opening 106 extending therethrough, a flat washer 108, and a nut 110. Each cam roller assembly 98 is attached to its associated support rail mounting boss 96 by positioning the bushing 104 in the opening of the boss 96, extending the stud 102 outwardly through the bushing opening 106, and then securing the washer and nut 108,110 to the outer end of the threaded stud 102.

Figure 13:
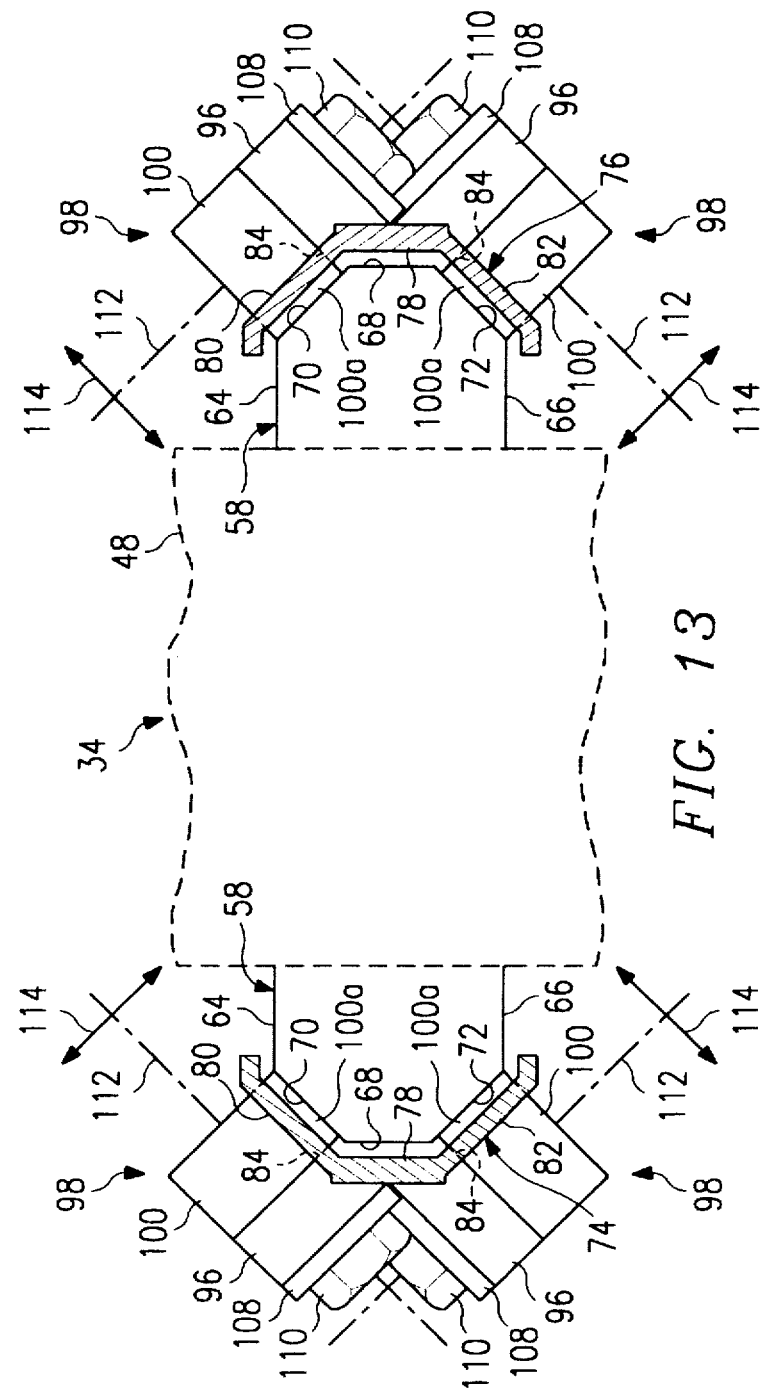
FIG. 13 is an enlarged scale, partially phantomed simplified cross-sectional view through the cradle structure, and the machine gun operatively supported therein, taken generally along line 13—13 of FIG. 6.

This positions the roller member 100 at an associated one of the support rail member cutout areas 84 in a manner permitting the roller member 100 to be laterally adjusted to cause a side portion 100a of the roller member 100 to project a selectively variable distance inwardly through its associated cutout area 84 and past the inner side surface of its associated support rail member (see FIGS. 6 and 13). Such adjustment of the roller member 100 relative to its associated support rail member is achieved by appropriately rotating the roller assembly boss 104 in the opening of its mounting boss 96, and then locking the rotationally adjusted boss 104 in place using, for example, a set screw (not shown). This adjustment of the roller members 100, as best shown in FIG. 13, laterally shifts their rotational axes 112 selected distances inwardly or outwardly, as indicated by the double-ended arrows 114, thereby correspondingly shifting the inwardly projecting roller member side portions 100a inwardly or outwardly relative to the inner side surfaces of their associated support rail member top and bottom edge walls 80 and 82.

With reference now to FIGS. 6 and 7, a spaced pair of upwardly projecting apertured mounting bosses 116 are formed on the top side of the aft ring structure 86, and a pair of outwardly projecting apertured mounting bosses 118 are formed on its opposite vertical side portions. Each of the bosses 118 extends through a corresponding vertically spaced pair of outwardly projecting apertured bosses 120 formed on rear end portions of the support rail members 74 and 76.

Positioned at the aft end of each of the support rail members 74,76 is a pin arm member 122 having a vertically spaced pair of top and bottom flanges 124,126 with apertures 128,130 in their outer ends. Pins 132,134 are respectively extendable through the vertically aligned flange opening pairs 128,130. Each pin arm member 122 is mounted on its associated rear support rail end portion by positioning the flange apertures 128 over the apertures in the mounting bosses 120, and then extending the pin 132 downwardly through the aligned openings in the flanges 124,126 and the openings in the bosses 118 and 120 as best shown in FIG. 6.

On each of the cradle structures 36 the two pins 134 extend through the flange apertures 130 in their associated pin arm member 122. Also, as schematically indicated in phantom in FIG. 5, the pins 134 extend vertically through the elongated slots 62 in the recoil housings 58 on the opposite sides of the receiver 48 of the machine gun 34 which longitudinally extends through the cradle structure 36 between its left and right support rail members 74,76 as illustrated in simplified form in FIG. 13.

As shown in FIG. 13, outer side portions of the opposite pair of recoil housings 58 are complementarily received in the support rail members 74 and 76, with the suitably adjusted inwardly projecting roller portions 100a rollingly engaging the sloping top and bottom corner wall portions 70,72 of the recoil housings 58. This rolling engagement and support of the machine gun 34 within the cradle structure 36 serves to preclude appreciable lateral movement of the supported gun 34 relative to the cradle structure 36 while at the same time permitting the gun 34 to freely move longitudinally along the cradle structure interior during firing recoil and counter recoil motion of the gun, to the extent permitted by the pins 134 that extend through the recoil housing slots 62 as schematically illustrated in FIG. 5.

Figure 10:
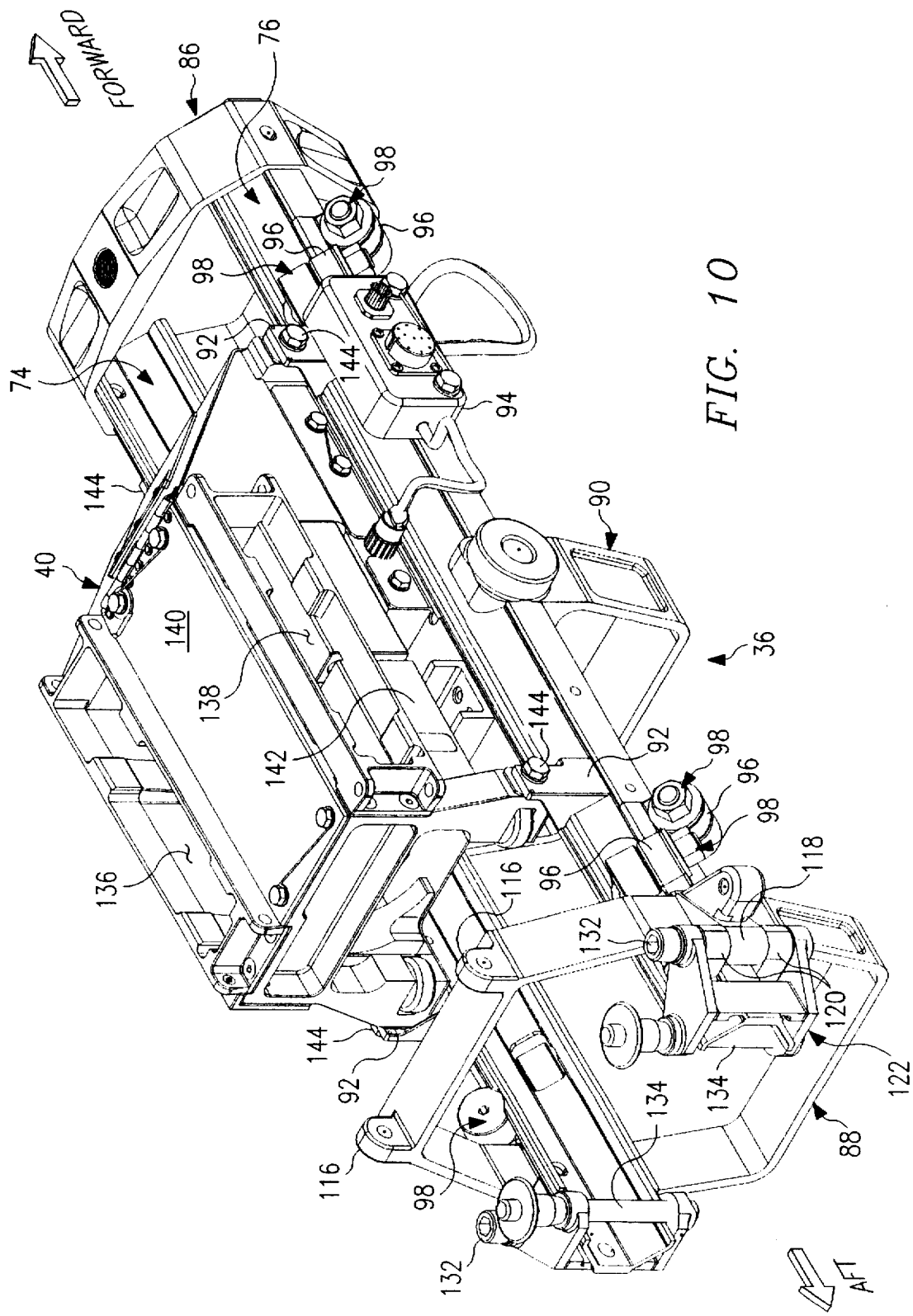
FIG. 10 is an enlarged scale aft end perspective view of the support cradle with ammunition feed structure portion of the armament apparatus secured to the top side of the cradle.

Referring now to FIG. 10, the ammunition feed structure 40 has a generally rectangular configuration, with elongated rectangular ammunition feed openings 136 and 138 being respectively formed in horizontal top wall and vertical side wall portions 140,142 of the feed structure. Each of the two feed structures 40 is secured to the top side of an associated cradle structure 36 by means of bolts 144 extending through the feeder attachment pads 92 into bottom corner portions of the ammunition feed structure 40. In a manner not pertinent to the present invention, and thus not described herein, the feed structures function to supply belted ammunition from the magazines 42 (see FIGS. 4 and 4A) to the machine guns 34 supported as described above within the cradle structures 36.

Figure 11:
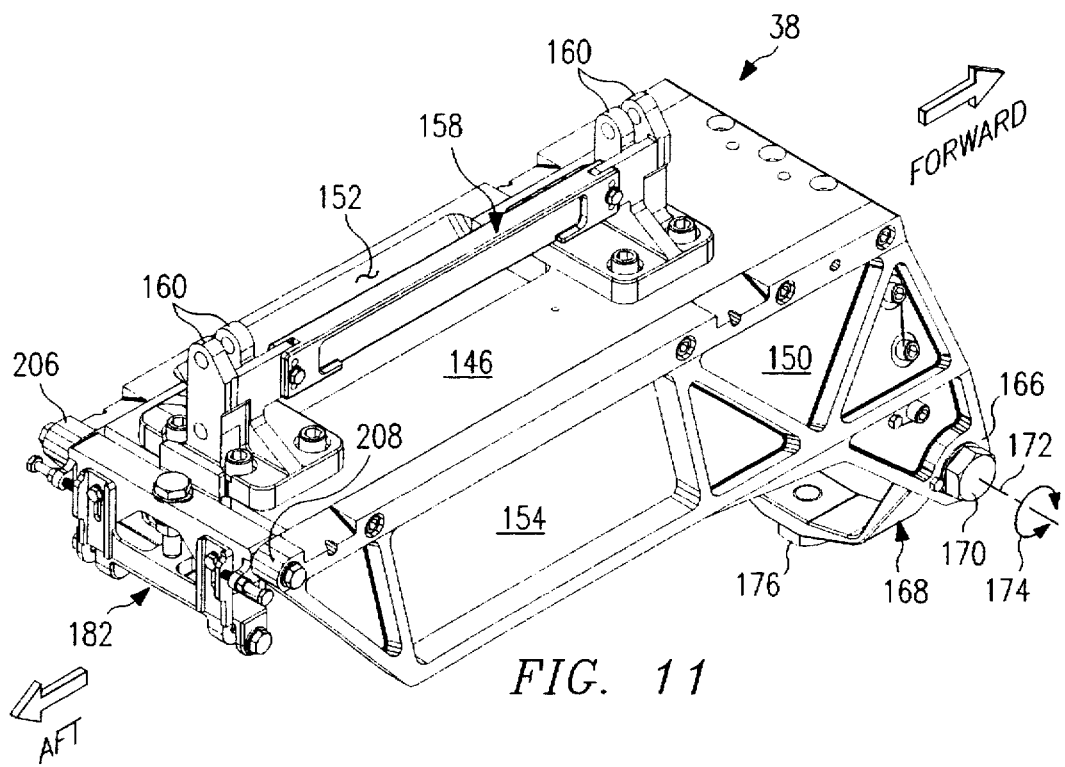
FIG. 11 is an enlarged scale aft end perspective view of a mount structure portion of the armament apparatus.
Figure 12:
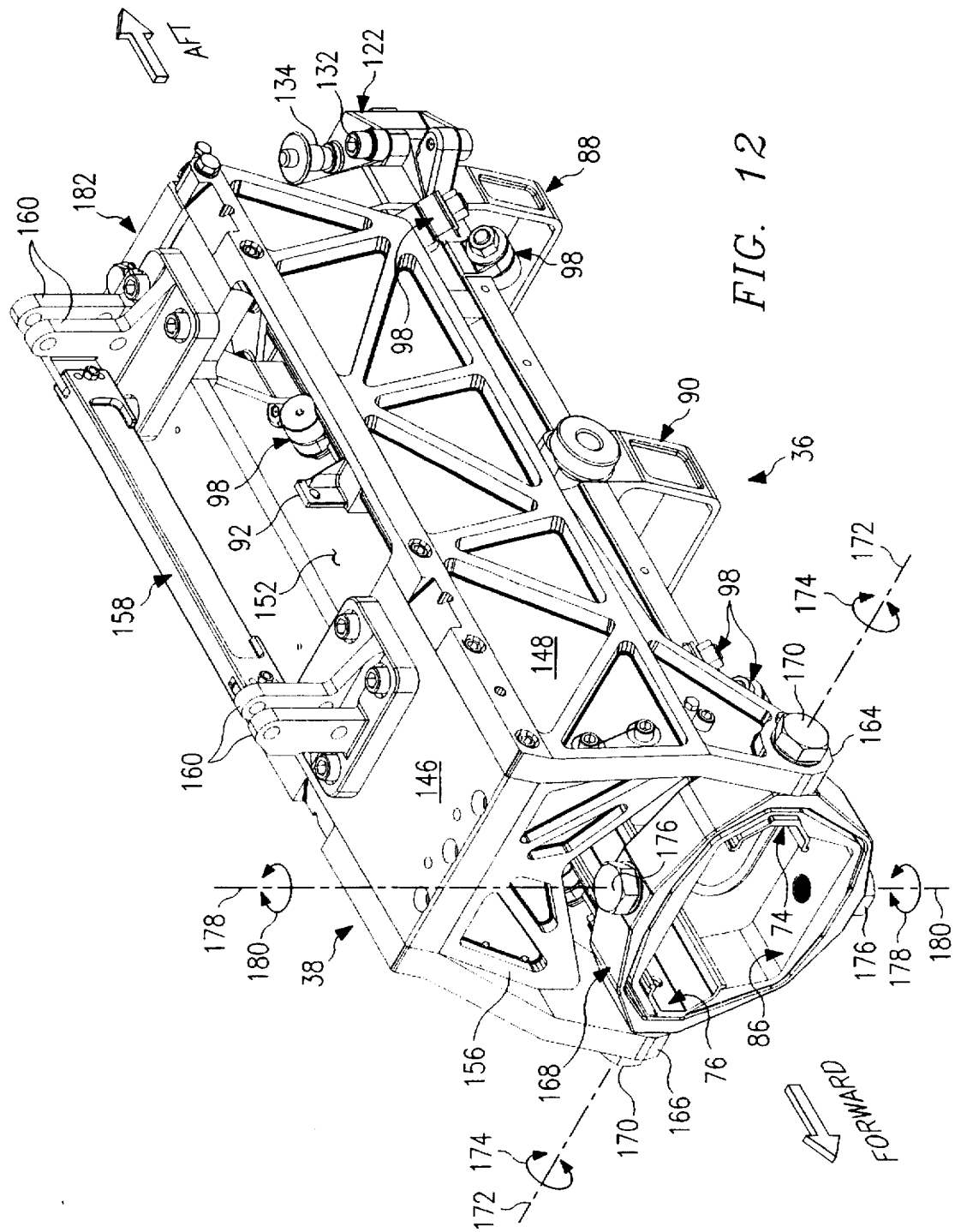
FIG. 12 is an enlarged scale forward end perspective view of the assembled cradle, with mount portions of the armament apparatus, less the feed structure.

The mount portion 38 of each of the two overall gun mounting structures is shown in FIGS. 11 and 12 and has a generally inverted U-shaped configuration defined by a generally rectangular top deck plate 146 and left and right side plates 148,150 respectively depending from left and right side edge portions of the deck plate 146. Elongated rectangular ammunition feed openings 152,154 are respectively formed in aft portions of the top deck plate 146 and the right side plate 150. As can be seen in FIG. 12, a front bulkhead plate 156 extends between forward end portions of the side plates 148 and 150.

Figure 11A:
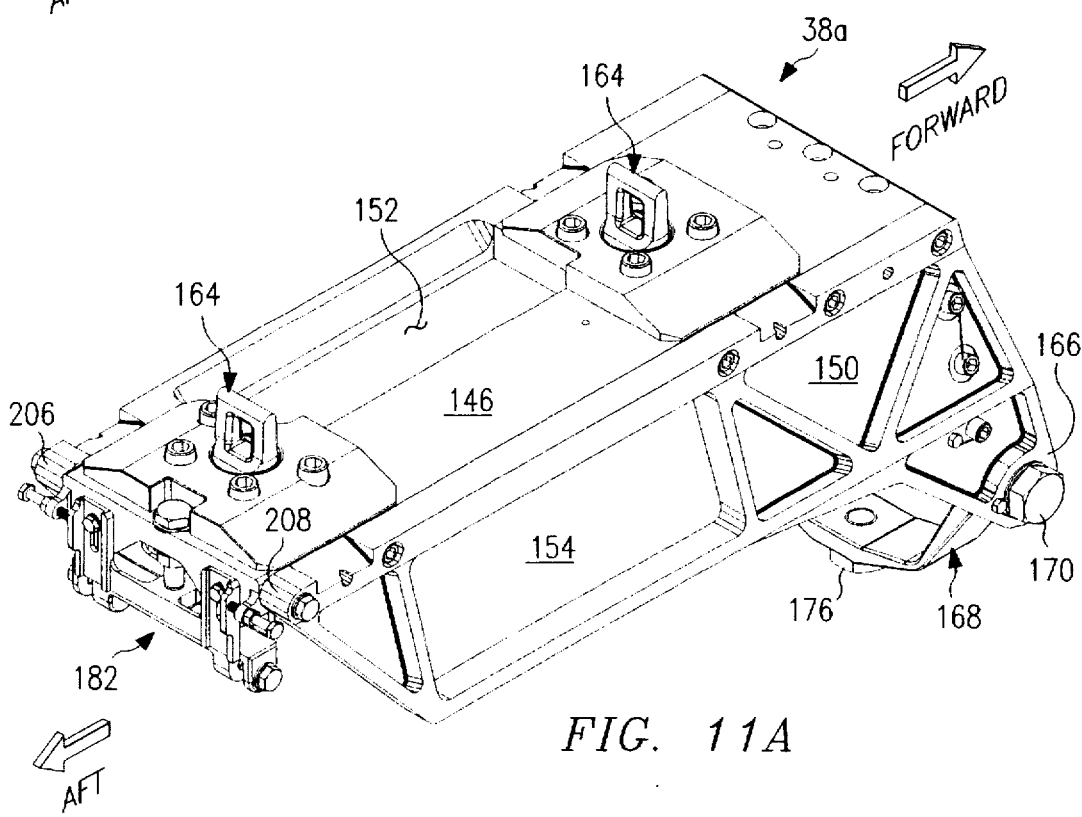
FIG. 11A is an aft end perspective view of an alternate embodiment of the mount structure.

Each of the two mount structures 38 is hung from one of the outer plank end portions 26,27 at its hinge line 30 (see FIGS. 4 and 4A) using a hinge line adapter structure 158 bolted to the top side of the deck plate 146 and including two spaced pairs of upwardly projecting tabs 160. Each tab pair 160 is interdigitated with a corresponding tab pair 32 on the associated plank end (see FIG. 4A) and releasably secured thereto using suitable retaining pin members 162 (see FIG. 4) extended through the interdigitated tab pairs. An alternate embodiment 38a of the mount structure 38 is illustrated in FIG. 11A and is identical to the mount structure 38 with the exception that the hinge line adapter structure 158 is replaced with a pair of bomb lug adapter structures 164 that may be removably secured to corresponding conventional bomb rack structures (not shown herein) mounted on the plank end portions 26 and 28.

The mount structure 38 is secured to the cradle structure 36, over the feed structure 40 (see FIG. 10), at forward and aft portions of the mount structure 38 in a manner which will now be described with continuing reference to FIGS. 11 and 12. Lower forward corner portions 166 of the side plates 148,150 are positioned outwardly over opposite left and right side portions of an outer gimbal ring member 168 and secured thereto by bolts 170 which extend inwardly through openings in the corner portions 166 and are threaded into the ring 168. Bolts 170 are rotatably received in the corner portion openings in a manner permitting the outer gimbal ring 168 to rotate relative to the mount structure 38 about a horizontal axis 172 as indicated by the double-ended arrows 174 in FIGS. 11 and 12.

The forward cradle end ring 86, as best illustrated in FIG. 12, serves as an inner gimbal ring and is received within the outer gimbal ring portion 168 of the mount structure 38. A diametrically opposite pair of bolts 176 extend inwardly through openings in top and bottom portions of the outer gimbal ring 168 and are threaded into top and bottom side portions of the inner ring 86. Bolts 176 are rotatable within their associated outer ring openings and thus permit the inner gimbal ring 86 to rotate relative to the outer ring 168 about a vertical axis 178 as indicated by the double-ended arrows 180 in FIG. 12.

Inner and outer gimbal rings 86 and 168, as described above, permit the cradle 36 (and thus the machine gun 34 supported by the cradle 36) to be rotated relative to the mount structure 38 about the horizontal and vertical axes 172,178 at a forward end of the mount structure 38 to thereby selectively adjust the gun bore sight elevation and azimuth angles. These elevation and azimuth angles may be selectively adjusted and then locked in by means of a specially designed bore sight adjustment subassembly 182 which is supported on an aft end portion of the mounting structure top deck plate 146 and interconnects aft end portions of the mounting structure 38 and cradle 36 as will now be described in conjunction with FIGS. 14 and 14A.

The bore sight adjustment subassembly 182 is of a quite simple construction, comprising only two primary parts—(1) an upper bracket member 184, and (2) a lower bracket member 186. The upper bracket member 184 has a generally rectangular body portion 188 which is elongated in a left-to-right direction and has downwardly thickened left and right end portions 190,192 with end surfaces 194 and 196. Slots 198,200 are elongated in left-to-right directions and pass in front-to-rear directions through the end portions 190,192. Additionally, a slot 202 extends downwardly through a longitudinally central portion of the body 188 and is elongated in a left-to-right direction.

Upper bracket member 184 is positioned in a top rear end cutout area 204 of the mount structure 38 between rearwardly projecting top left and right corner portions 206,208 of the side plates 152 and 150, and is pivotally secured to the corner portions 206,208 by bolts 210,212 extending through the corner portions 206,208 and threaded into openings 214 extending inwardly into the opposite end surfaces 194,196 of the body 188. A pair of rearwardly projecting apertured retaining ears 216 are formed on the left and right body end portions 190,192 and have adjustment bolts 218 extending horizontally inwardly therethrough and provided with jam nuts 220 on the outer sides of the ears 216. A larger adjustment bolt 222 passes downwardly through the top side body slot 202, through a flat washer 224, and is threaded through a jam nut 226.

The lower bracket member 186 has a generally U-shaped configuration defined by a generally rectangular body portion 228 elongated in a left-to-right direction and having an upwardly thickened longitudinally central section 230, and laterally spaced front and rear support plate pairs 232,234 projecting upwardly from opposite end portions of the body 228. Vertically elongated slots 236,238 are respectively formed in the front and rear support 232 and 234, and adjustment ears 240 project rearwardly from upper portions of the rear support plates 234. Projecting downwardly from each of the opposite ends of the lower bracket member body 228 are longitudinally spaced apertured mounting tab pairs 242,244.

Figure 14:
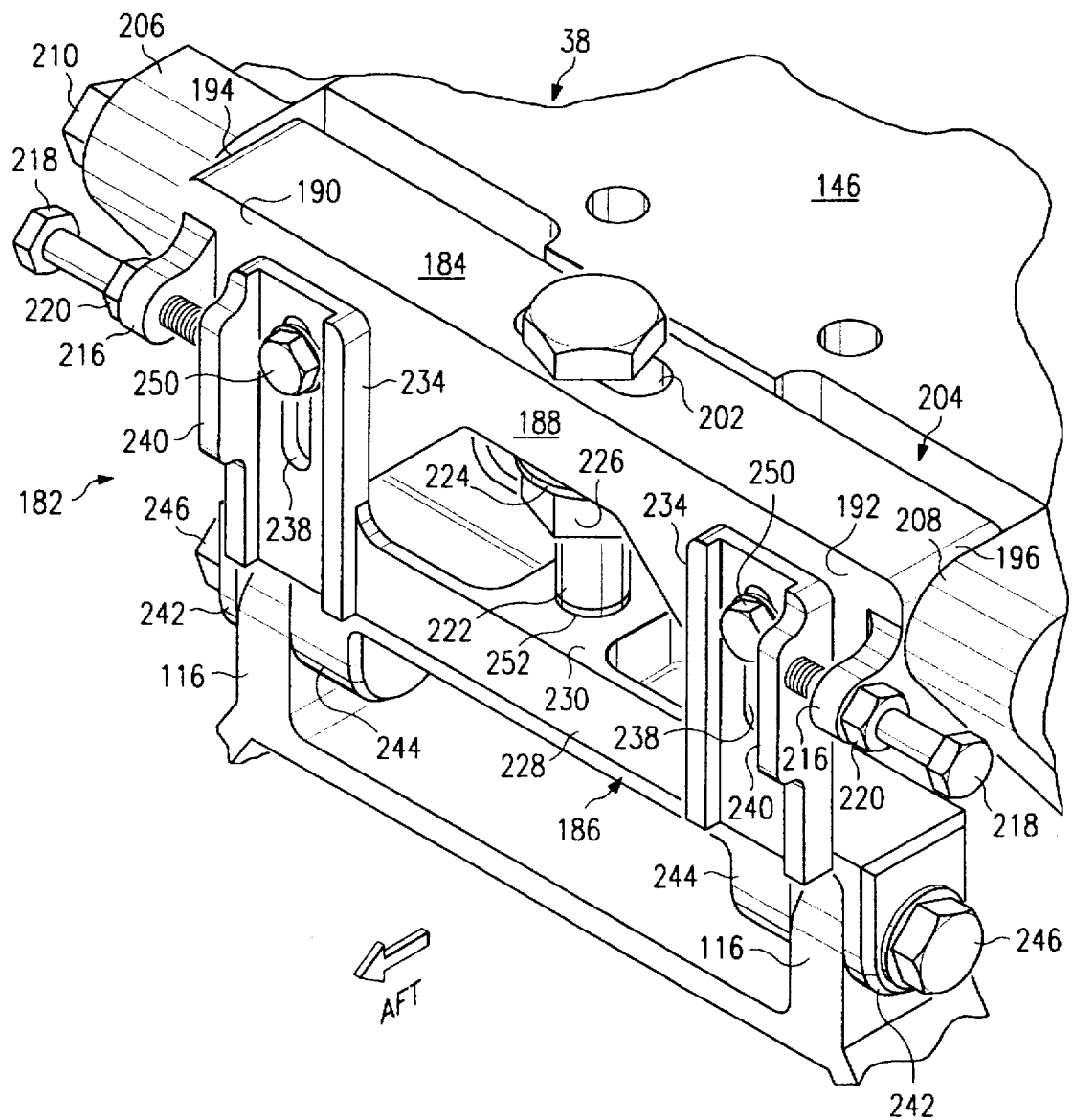
FIG. 14 is an enlarged scale aft side perspective view of a bore sight adjustment subassembly attached to the mount portion.
Figure 14A:
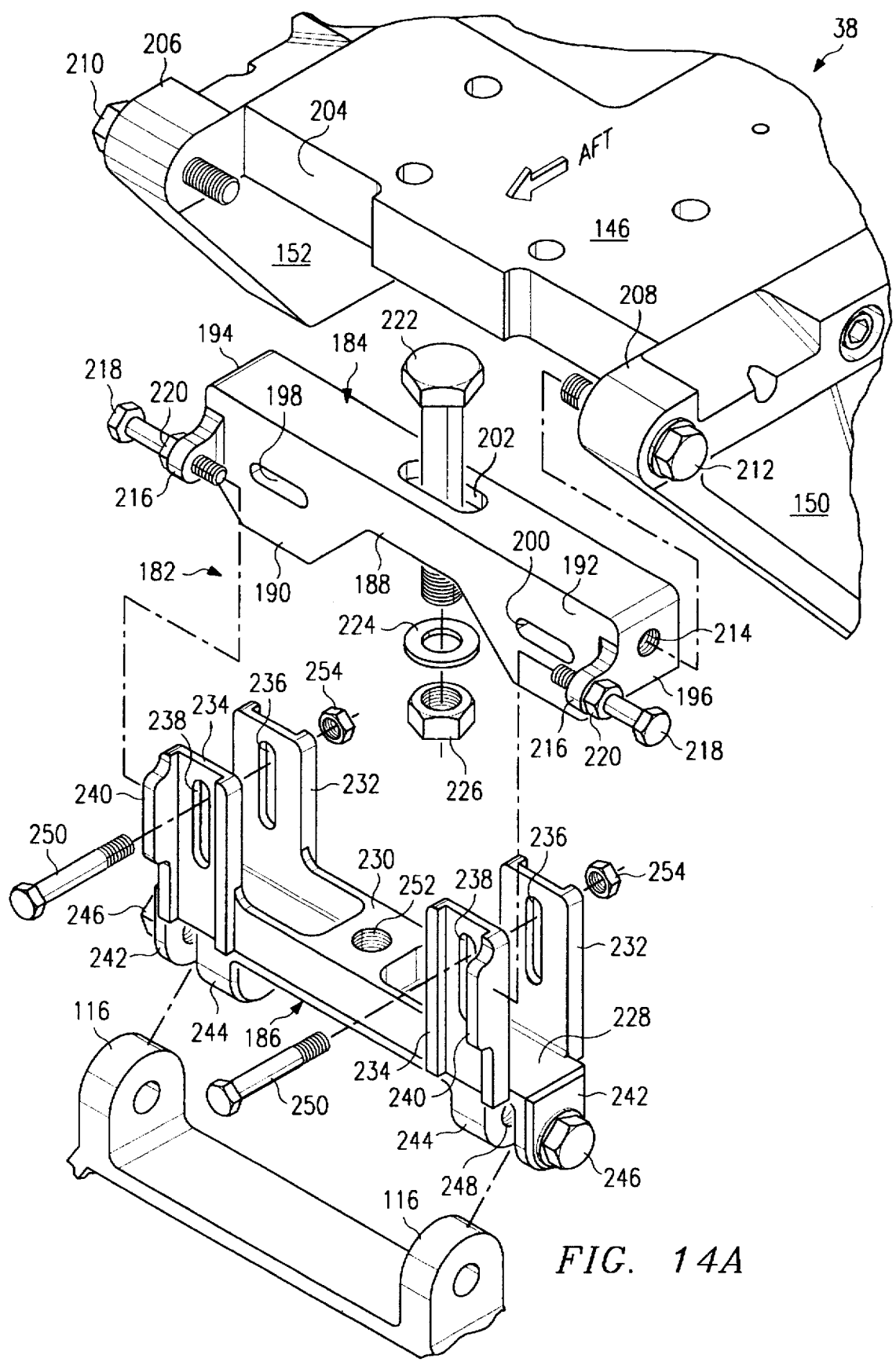
FIG. 14A is an exploded perspective view of the bore sight adjustment subassembly.

Lower bracket member 186 is pivotally secured to an aft end portion of the cradle structure 36 by passing the aft ring structure mounting bosses 116 (see also FIGS. 6 and 7) upwardly into the spaces between the downwardly projecting lower bracket member tab pairs 242,244 (see FIG. 14) and then passing connecting bolts 246 inwardly through apertures in the tabs 242 and bosses 116 and threading the inner ends of the bolts 246 into threaded openings 248 in the tabs 244 (see FIG. 14A). The opposite end portions 190,192 of the upper bracket member 184 are slidably received between the lower bracket member front and rear support plate pairs 232,234 in a manner permitting relative horizontal and vertical sliding movement between the nested upper and lower bracket members 184,186.

Still referring to FIGS. 14 and 14A, the nested upper and lower bracket members 184,186 are releasably retained in selectively variable vertical and left-to-right horizontal orientations relative to one another by the vertical adjustment bolt 222, the horizontally oriented adjustment bolts 218, and a pair of horizontally oriented adjustment bolts 250. The lower end of the vertical bolt 222 is threaded into an internally threaded opening 252 in the central section 230 of the lower bracket member body 228 and is locked in its rotational orientation by the jam nut 226, and the inner ends of the adjustment bolts 218 bear against the outer sides of the ears 240, with the bolts 218 being locked in their rotational orientations by their associated jam nuts 220. The adjustment bolts 250 forwardly pass sequentially through the vertical support plate slots 238, the horizontal upper bracket member slots 198, and the vertical support plate slots 236, and are threaded into nuts 254 positioned on the front sides of the lower bracket member front support plates 232.

It can be seen that with the bolts 218,222 and 250 loosened the lower bracket member 186 may be vertically moved relative to the upper bracket member 184, thereby correspondingly moving an aft portion of the cradle structure 36 vertically relative to an aft portion of the mount structure 38. This, in turn, causes the cradle structure 36 (and thus the machine gun 34 supported therein) to pivot about the horizontal front gimbal axis 172 (see FIG. 12) in a manner correspondingly varying the gun's bore sight elevational angle. Also, the lower bracket member 186 may be moved horizontally in a left-to-right direction relative to the upper bracket member 184, thereby correspondingly moving an aft portion of the cradle structure 36 horizontally relative to an aft portion of the mount structure 38. This, in turn, causes the cradle structure 36 (and thus the machine gun 34) to pivot about the vertical front gimbal axis 178 (see FIG. 12) in a manner correspondingly varying the gun's bore sight azimuth angle.

As an example, with reference to FIG. 14, to change the gun's azimuth angle the jam nut 226 and the bolts 218 and 250 are loosened, and the lower bracket member is slid leftwardly or rightwardly as needed relative to the upper bracket member 184. The jam nut 226 and the bolts 218 and 250 are then retightened to hold the gun in its new azimuth-adjusted position. Similarly, to adjust the elevation angle of the gun, the jam nut 226 and the bolts 218 and 250 are loosened, and the vertical bolt 222 is tightened or loosened in the threaded body opening 252 as necessary to raise the lower bracket member 186 relative to the upper bracket member 184, or permit the lower bracket member 186 to be moved downwardly relative to the upper bracket member 184. The jam hut 226 and the bolts 218 and 250 are then retightened to hold the gun in its new elevation-adjusted position.

Referring now to FIGS. 4, 4A, 10 and 11, in the overall armament apparatus 10 (see FIGS. 4 and 4A) the feed chute adapters 46a,46b are similar in construction and operation to those illustrated and described in the aforementioned U.S. Pat. No. 5,419,234 but are sized to handle 30 mm ammunition. The left feed chute adapter 46a has a generally L-shaped configuration, with its open top end being operatively connected to the outer end of the left flex chute structure 44, and its open bottom end being coupled to the left feed structure 40 via the top openings 152,136 in the left mount structure 38 (see FIG. 11) and the left feed structure 40 (see FIG. 10). The right feed chute adapter 46b has a generally U-shaped configuration, with its open top end being operatively connected to the outer end of the right flex chute structure 44, and its open bottom end being coupled to the right feed structure 40 via the side openings 154,138 in the right mount structure 38 (see FIG. 11) and the right feed structure 40 (see FIG. 10).

The unique machine gun mounting structure just described, which serves to support the machine guns 34 on the outer plank end portions 26 and 28, provides several advantages over conventionally constructed external aircraft machine gun mounting apparatus. For example, the axis-adjustable roller support of the cradle-mounted machine gun 34 firmly precludes appreciable lateral movement of the gun relative to its cradle structure 36, and thus with respect to the overall mounting structure, while permitting free longitudinal travel of the gun relative to the mounting structure. This precise lateral support of the gun permits the weapon system shown in FIG. 4 to be a "point" weapon system instead of a decidedly less accurate "area" weapon system.

Moreover, the pin and slot connection of the cradle structure 36 to its associated gun 34 permits the gun 34, during firing thereof, to move through a substantially longer recoil and counter recoil stroke than conventional 30 mm machine guns, thereby reducing the maximum firing forces transmitted to the mounting structure and to the support plank. Aiding this recoil force reduction is the unique mounting of the feed structure 40 to the stationary mounting structure instead of on the gun 34 for recoil and counter recoil longitudinal reciprocation therewith.

Complementing the firing accuracy improvement obtained by the previously described roller-support of the cradle mounted machine gun is the simplicity and accuracy of the aft-mounted bore sight adjustment structure 182 that, with the forward cradle-to-mount gimbaling system, provides for rapid, easy and reliable firing elevation and azimuth angle adjustment of the gun.

While the mounting structure described herein has been representatively illustrated and described in conjunction with 30 mm machine guns, it will be readily appreciated by those skilled in the aircraft armament art that the principles of the present invention could be advantageously applied to other types of machine guns as well if desired.

The foregoing detailed description is to be clearly understood as being given by way of illustration and example only, the spirit and scope of the present invention being limited solely by the appended claims.

What is claimed is:

1. Apparatus for supporting a machine gun having a firing axis and a receiver portion with side sections extending parallel to and spaced apart around the firing axis, said apparatus comprising:

- a cradle structure having a plurality of elongated parallel support members positionable to extend in an outwardly opposing, parallel relationship with the side sections of the receiver portion;
- a roller system associated with said support members and operative to engage the receiver portion side sections in a manner (1) rollingly supporting the machine gun for axial movement relative to said cradle structure, and (2) precluding appreciable lateral movement of the machine gun relative to said cradle structure during said axial movement, said roller system being adjustable in a manner selectively varying the lateral orientation of the supported machine gun relative to said cradle structure; and
- an interconnection structure carried by said cradle structure and operative to engage the supported machine gun in a manner permitting only a predetermined length of axial travel thereof relative to said cradle structure.

2. The apparatus of claim 1 further comprising:
- a mount structure,
- a gimbal structure interconnected between said cradle structure and said mount structure and permitting pivotal adjustment movement of said cradle structure relative to said mount structure about two mutually perpendicular bore sight adjustment axes each perpendicular to the firing axis, and
- a bore sight adjustment structure interconnected between said mount structure and said cradle structure and being operative to releasably hold said cradle structure in a selectively variable pivotally adjusted position relative to said mount structure.

3. The apparatus of claim 2 further comprising:
- an ammunition feed structure operatively associatable with the supported machine gun and fixedly supported on said cradle structure, whereby the supported machine gun is axially movable relative to said ammunition feed structure.

4. The apparatus of claim 3 wherein said mount structure is secured to said cradle structure over said ammunition feed structure.

5. The apparatus of claim 4 wherein:
- said ammunition feed structure has a first spaced plurality of ammunition receiving openings formed therein, and
- said mount structure has a second spaced plurality of ammunition receiving opening formed therein and aligned with said first spaced plurality of ammunition receiving openings.

6. The apparatus of claim 2 wherein said mount structure is configured to be releasably connectable to a hinge line portion of an elongated aircraft armament support plank member.

7. The apparatus of claim 2 wherein said mount structure has first and second bomb lug adapter structures thereon.

8. The apparatus of claim 2 wherein said bore sight adjustment structure includes:
- a first member secured to said mount structure,
- a second member secured to said cradle structure,
  - said first and second members being in a nested arrangement permitting relative sliding adjustment movement therebetween in first and second perpendicular directions respectively parallel to said mutually perpendicular bore sight adjustment axes, and
- a locking structure operative to releasably lock said first and second members in selectively variable relatively adjusted positions thereof.

9. The apparatus of claim 8 wherein said first and second members, respectively, are pivotally secured to said mount structure and said cradle structure.

10. The apparatus of claim 9 wherein said first and second members are pivotable relative to said mount structure and said cradle structure about generally parallel axes.

11. The apparatus of claim 1 wherein:
- each of said support members has, along its length, a spaced plurality of openings formed therein, and
- said roller system includes a plurality of roller members mounted on outer sides of said support members and being adjustable relative thereto to move side portions of said roller members selectively variable distances inwardly through said support member openings to releasably locked adjusted positions.

12. The apparatus of claim 11 wherein said roller system includes a plurality of cam roller assemblies mounted on said support members, each of said cam roller assemblies including one of said roller members.

13. The apparatus of claim 12 wherein:
- said plurality of elongated parallel support members is defined by two laterally opposing support rail members each having, along its length, an outer side wall portion with inturned sloping opposite edge portions,
- said plurality of openings are formed in said sloping edge portions, and
- said plurality of cam roller assemblies extend over said plurality of openings.

14. The apparatus of claim 13 wherein said edge portions are each sloped at an angle of approximately 45 degrees relative to its associated outer side wall portion.

15. Aircraft armament apparatus comprising:
- a support plank having an outer end portion;
- a mount structure;
- means for securing said mount structure to said outer end portion of said support plank;
- a machine gun having a barrel extending along a firing axis, and a receiver portion having an opposite pair of side sections extending generally parallel to said firing axis;
- a cradle structure receiving said machine gun and having a plurality of elongated parallel support members extending in an outwardly opposing, parallel relationship with said side sections of said receiver portion;
- roller means associated with said support members and engaging said side sections of said receiver portion in a manner (1) rollingly supporting said machine gun for axial movement relative to said cradle structure, and (2) precluding appreciable lateral movement of said machine gun relative to said cradle structure during said axial movement, said roller means being adjustable in a manner selectively varying the lateral orientation of said machine gun relative to said cradle structure;
- interconnection means carried by said cradle structure and operative to engage said machine gun in a manner permitting only a predetermined length of axial travel thereof relative to said cradle structure;
- pivot means interconnected between said cradle structure and said mount structure permitting pivotal adjustment movement of said cradle structure relative to said mount structure about first and second mutually perpendicular bore sight adjustment axes each perpendicular to said firing axis of said machine gun; and
- bore sight adjustment means interconnected between said mount structure and said cradle structure and being operative to releasably hold said cradle structure in a selectively variable pivotally adjusted position relative to said mount structure.

16. The aircraft armament apparatus of claim 15 wherein said machine gun is a 30 mm machine gun.

17. The aircraft armament apparatus of claim 15 wherein:
each of said support members has, along its length, a spaced plurality of openings formed therein, and
said roller means include a plurality of roller members mounted on outer sides of said support members and being adjustable relative thereto to move side portions of said roller members selectively variable distances inwardly through said support member openings, into rolling engagement with said receiver portion side sections, to releasably locked adjusted positions.

18. The aircraft armament apparatus of claim 17 wherein said roller means include a plurality of cam roller assemblies mounted on said support members, each of said cam roller assemblies including one of said roller members.

19. The aircraft armament apparatus of claim 18 wherein:
each of said support members has, along its length, an outer side wall portion with inturned sloping opposite edge portions,
said plurality of openings are formed in said sloping edge portions, and
said plurality of cam roller assemblies extend over said plurality of openings.

20. The aircraft armament apparatus of claim 19 wherein:
said edge portions are each sloped an angle of approximately 45 degrees relative to its associated outer side wall portion, and
said side sections of said receiver portion have sloping corner portions facing and parallel to said edge portions and rollingly engaged by said side portions of said roller members.

21. The aircraft armament apparatus of claim 20 wherein said side sections of said receiver portion are defined by elongated recoil housing structures.

22. The aircraft armament apparatus of claim 15 wherein:
said side sections of said receiver portion are defined by elongated recoil housing structures having top and bottom sides with opposing, longitudinally elongated slots formed therein, and
said interconnection means include pin members carried by said cradle structure and extending through said opposing slots.

23. The aircraft armament apparatus of claim 15 wherein said pivot means include:

a first ring member secured to said mount structure for pivotal movement relative thereto about said first bore sight adjustment axis, and
a second ring member carried by said cradle structure and secured to said first ring member for pivotal movement relative thereto about said second bore sight adjustment axis.

24. The aircraft armament apparatus of claim 15 wherein said bore sight adjustment means include:
a first member secured to said mount structure,
a second member secured to said cradle structure,
said first and second members being in a nested arrangement permitting relative sliding adjustment movement therebetween in first and second perpendicular directions respectively parallel to said first and second bore sight adjustment axes, and
a locking structure operative to releasably lock said first and second members in selectively variable relatively adjusted positions thereof.

25. The aircraft armament apparatus of claim 24 wherein said first and second members, respectively, are pivotally secured to said mount structure and said cradle structure.

26. The aircraft armament apparatus of claim 25 wherein said first and second members are pivotable relative to said mount structure and said cradle structure about generally parallel axes.

27. The aircraft armament apparatus of claim 15 further comprising an ammunition feed structure fixedly secured to said cradle structure, whereby said machine gun is axially movable relative to said ammunition feed structure.

28. The aircraft armament apparatus of claim 27 wherein said mount structure is secured to said cradle structure over said ammunition feed structure.

29. The aircraft armament apparatus of claim 27 further comprising:
an ammunition magazine box mounted on said support plank, and
an elongated flexible ammunition feed chute structure operatively interconnected at its opposite ends to said ammunition magazine box and said ammunition feed structure.

30. The aircraft armament apparatus of claim 29 wherein:
said aircraft armament apparatus further comprises an internally rollered ammunition feed adapter operatively connected to said ammunition feed structure, and
said elongated flexible ammunition feed chute structure extends between said ammunition magazine box and said internally rollered ammunition feed adapter.

* * * * *